Aug. 12, 1930.  D. D. MYERS  1,772,754

SHOCK ABSORBER

Filed April 16, 1928

Inventor

Don D. Myers

By Whittemore Hulbert
Whittemore & Belknap

Attorneys

Patented Aug. 12, 1930

1,772,754

UNITED STATES PATENT OFFICE

DON D. MYERS, OF TOLEDO, OHIO, ASSIGNOR TO MONROE AUTO EQUIPMENT COMPANY, OF MONROE, MICHIGAN, A CORPORATION OF MICHIGAN

SHOCK ABSORBER

Application filed April 16, 1928. Serial No. 270,466.

The present invention pertains to shock absorbers for cushioning the movement of two relatively movable members and more particularly to certain novel features of construction which tend to simplify, render more efficient and improve generally devices of this character.

Generally speaking, shock absorbers of the class to which this invention pertains comprise a fluid chamber and a cylinder, a piston in said cylinder, spring means acting to normally raise said piston and valve controlled inlet and outlet ports for controlling the inlet and outlet of a fluid from the fluid chamber to the said cylinder. It is usually customary and quite desirable to so construct the inlet port and valve therefor that the fluid may flow quickly and freely into the cylinder upon the upward movement of the piston. In many cases the valve and the guiding means therefor are located within the cylinder immediately adjacent the inlet port. With any construction of this particular nature and particularly with such types of construction as hereinbefore mentioned it is highly desirable and expedient to provide a valve and valve retaining or guiding means which may be readily assembled with the remaining structure. It is likewise desirable to provide a valve construction which may be readily and economically manufactured and which will act under all conditions to efficiently discharge the functions it is to perform.

It is therefore one of the primary objects of this invention to provide a valve construction for shock absorbers of, for instance, the hydraulic type, which may be rapidly and economically manufactured; quickly and easily installed or assembled; and which will act efficiently under all conditions. Still another object of this invention is to provide a valve construction of this nature which is small and compact thereby enabling the same to be readily associated with the piston cylinder, preferably interiorly thereof, without in any manner interfering with the reciprocation of the piston or the action of the piston raising spring.

To this end the invention contemplates a disk-like valve disposed within a recess in the bottom of the cylinder, the movement of the valve in its open position being restricted or limited for instance by the end of the piston raising spring which rests upon a shoulder peripherally surrounding the said valve.

The several objects, advantages and novel details of construction of the invention will be made more apparent as this description proceeds, especially when considered in connection with the accompanying drawings, wherein.

Figures 1, 2, 3, 4:
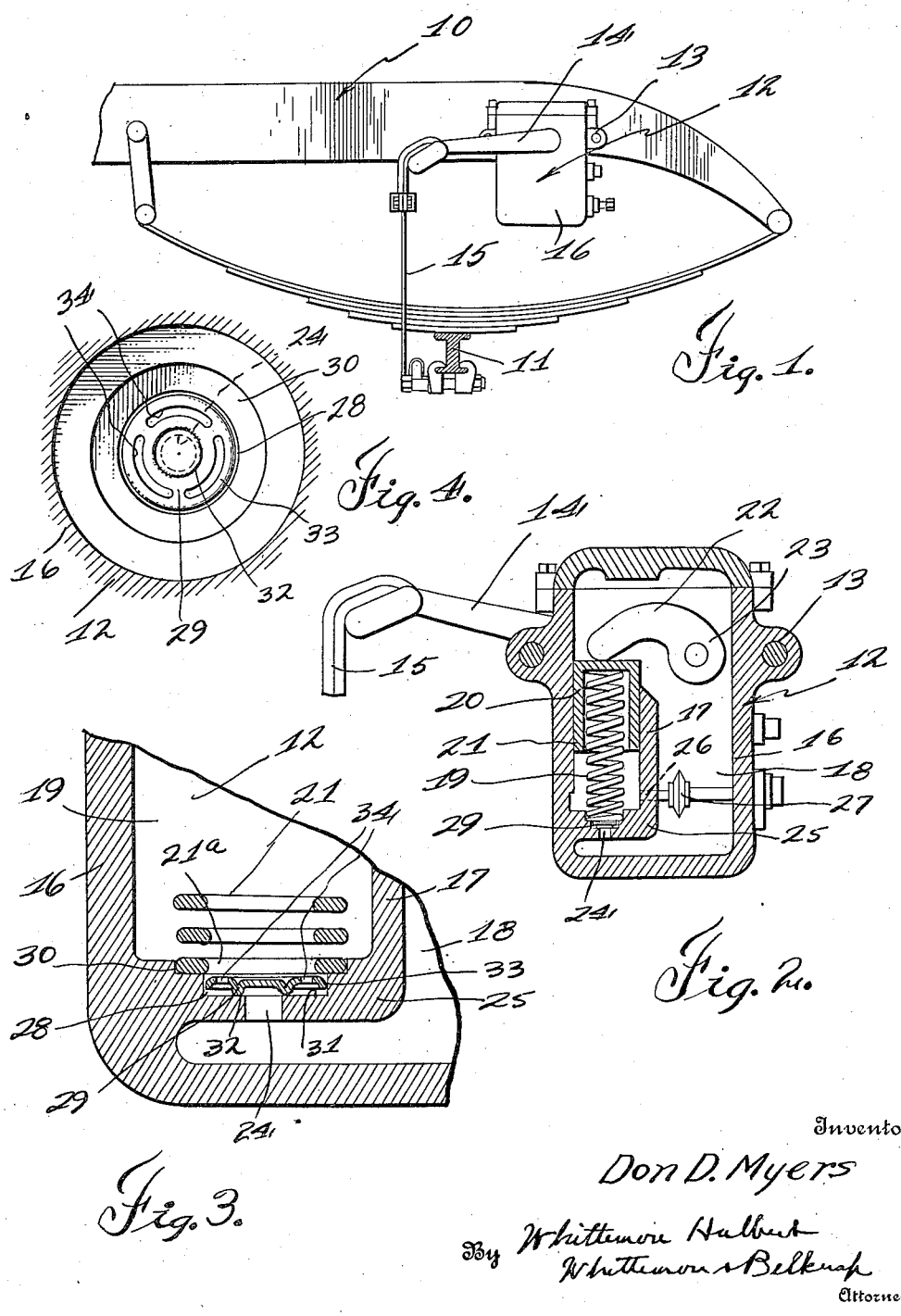
Figure 1 is a fragmentary side elevational view of a pair of relatively movable members with a shock absorber embodying my invention associated therewith.
Figure 2 is an enlarged vertical sectional view through the shock absorber illustrated in Figure 1.
Figure 3 is an enlarged fragmentary vertical sectional view through the inlet valve of the shock absorber.
Figure 4 is a fragmentary horizontal sectional view taken substantially on the plane indicated by line 4—4 in Figure 3.

Referring now more particularly to the drawings wherein like reference characters indicate like parts it will be noted that there is illustrated in Figure 1 a pair of relatively movable members 10 and 11 which may, for instance, be the frame and axle of a motor vehicle. The shock absorber indicated generally by the reference character 12 is adapted to be secured by ears, or the like 13 to one of the relatively movable members, for instance, the frame 10 while an oscillatable arm 14 associated with the shock absorber is adapted to be connected as for instance by means of a flexible connection 15 to the other relatively movable member 11.

The shock absorber 12 comprises a casing 16 adapted to be divided by a wall 17 to present a fluid chamber 18 and a cylinder 19. A piston 20 is reciprocable in the cylinder 19 and is normally urged in an upward direction by means of a spring 21. An interior arm 22 bears on the upper end of piston 20, this arm 22 being formed with a hub portion 23 which is integral with or otherwise connected to the exterior arm 14.

The casing 16 is adapted to contain a quantity of fluid such for instance as oil and upon the upward movement of piston 20 the fluid is adapted to pass freely into the cylinder 19 through inlet port 24 formed in the head 25 of the cylinder. Upon the downward movement of the piston the inlet port 24 is adapted to be closed, by a valve device yet to be referred to in detail, and the fluid trapped in the lower end of cylinder 19 is forced outwardly through outlet port 26 controlled by a valve device 27. The valve device 27 restricts the flow of the liquid from the cylinder 19 so as to cushion the downward movement of piston 20 and consequently the movement of arms 22 and 14. This effects a cushioning or retards the movement of the relatively movable members 10 and 11 in one direction in the manner well known in this particular art.

The head 25 of cylinder 19 is counter-bored as indicated at 28 to form a recess or guide for a valve member 29 and is also counter-bored as at 30 to form a seat for the lower end of spring 21. As previously mentioned the function of spring 21 is to raise piston 20 and to maintain the same normally in the position illustrated in Figure 2. It will be noted that the depth of counter-bore 28 is sufficient to permit of a limited movement of valve 29 between the bottom 31 of the counter-bore upon which the valve 29 normally rests and the lower coil 21$^a$ of spring 21.

The character and nature of valve member 29 is such that it may be conveniently stamped or pressed from sheet metal and this valve member is formed with a circular return-bent portion forming a rib or bead 32, of a diameter slightly larger than the diameter of inlet port 24. This bead 32 rests upon the bottom 31 of counter-bore 28 and provides a line contact between the valve member and its seat. The outer periphery or edge of the valve member is bent to provide an axially extending flange 33 adapted to have a guiding engagement or contact with the side walls of the counter-bore 28. This provides for efficiently guiding the valve member in its movement from open to closed positions and vice-versa. Obviously sufficient clearance is provided between the periphery of the valve member and the wall of the counter-bore 28 so as to permit the valve member 29 to freely move within this counter-bore.

The valve member 29 is provided with a plurality of circumferentially arranged apertures 34 which permit the fluid to flow therethrough and into cylinder 19 after the valve 29 has been raised from its seat. These openings or apertures 34 as illustrated are located between the seating rib 32 and the periphery of the valve member.

With the herein described construction valve member 29 will normally rest upon the bottom of spring 21 of counter-bore 28 and close the inlet port 24. However, upon the upward movement of piston 20 the suction will lift valve member 29 from its seat end permit the fluid to flow freely through inlet port 24 and apertures 34 and to some limited extent around the periphery of valve member 29 and into cylinder 19. The upward movement of the valve member 29 will obviously be limited by its engagement with the lower coil 21$^a$ of coil spring 21. By reason of the peripheral flanges 33 the valve will be adequately guided in its movement so that the same will not become tilted which might cause it to stick. Obviously upon the downward movement of piston 20 the pressure of the fluid will positively seat valve member 29 and prevent the escape of the fluid through port 24. By forming the valve with the bead or rib 32 a line contact is made possible between the valve member and its seat so that possibility of the valve not becoming fully seated is reduced to a minimum.

Obvious modifications of the illustrative embodiment of the invention herein shown and describtd may suggest themselves to those skilled in this art and to this end reservation is made to make such changes, modifications and rearrangements of parts as may come within the purview of the accompanying claims.

What I claim as my invention is:

1. In a device for cushioning the movement of two relatively movable members, the combination with a cylinder having a port, a piston in said cylinder and piston moving means, of a valve for said port, a seat for said valve surrounding said port with respect to which said valve is movable and means for limiting actuation of said valve comprising said piston moving means.

2. In a device for cushioning the movement of two relatively movable members, the combination with a cylinder having an inlet port, a piston in said cylinder and piston moving means, of a valve member for closing said inlet port, the wall of said cylinder adjacent said port being recessed to receive said valve member and means for limiting actuation of said valve member comprising the adjacent portion of said piston moving means.

3. In a device for cushioning the movement of two relatively movable members, the combination with a cylinder provided with an inlet port, a piston in said cylinder and a spring in said cylinder engaging said piston and acting to raise the same, of a valve member for controlling said inlet port and means for limiting actuation of said valve member comprising in part said spring.

4. In a shock absorber of the character described, the combination with a cylinder having an inlet port, a piston in said cylinder and a spring in said cylinder engaging said piston and acting normally to raise the same, of a valve member for controlling said inlet port, the wall of said cylinder adjacent said inlet port being counter-bored to slidably support said valve member and means for supporting one end of said spring adjacent said counter-bore for limiting actuation of said valve member in one direction.

5. In a shock absorber of the character described, the combination with a cylinder having an inlet port, a piston in said cylinder and a spring in said cylinder engaging said piston and acting normally to raise the same, of a valve member for controlling said inlet port, the wall of said cylinder being formed with a counter-bore to slidably receive said valve member, and a second counter-bore arranged adjacent thereto and providing a seat for one end of said spring whereby said spring provides means for limiting actuation of said valve member in one direction.

6. In a shock absorber of the character described, the combination with a cylinder having an inlet port, a piston in said cylinder and a spring acting normally to move said piston in one direction, of a disk-like valve member for controlling said inlet port, the wall of said cylinder adjacent said inlet port being formed with a pair of counter-bores, one of which is adapted to slidably support said valve member, one end of said spring seating in the other counter-bore and acting as a stop to restrict the movement of said valve member in one direction.

7. In a device of the character described, the combination of a cylinder provided with a port and a recess surrounding the port, a disk-like valve member located in said recess and controlling said port, said valve member being formed with a rib seating on the bottom of said recess and with a peripheral flange having a guiding engagement with the wall of said recess.

8. In a device of the character described, the combination of a cylinder provided with a port and counterbored around said port to provide a recess, a disk-like valve member located in said recess and controlling said port, said valve member being formed with a circular rib seating on the bottom of said recess adjacent the edge of said port to provide a line contact between said valve and its seat and a peripheral flange formed on said valve member to provide a guiding surface engaging the wall of said recess.

9. In a device of the class described, the combination of a cylinder provided with a port and counter-bored adjacent said port to provide a surrounding recess, a sheet metal disk-like valve member arranged in said recess for controlling said port, said valve member being bent to form a circumferential rib seating with a line contact on the bottom of said recess around said port, a peripheral flange formed on said valve member providing a guiding surface cooperating with the wall of said recess for guiding said valve member, said valve member being formed with apertures therethrough between said rib and peripheral flange.

10. In a device for cushioning the movement of two relatively movable members, the combination with a cylinder provided with a port, a piston in said cylinder and a spring in said cylinder engaging said piston and acting to move the same in one direction, of a valve member for controlling said port, the wall of said cylinder adjacent said port being recessed to receive said valve, said spring being so located with respect to said recess that the adjacent end of said spring limits the movement of said valve in one direction.

11. In a shock absorber, the combination of a cylinder having a port and a valve receiving chamber surrounding the port, a piston in said cylinder, means for moving said piston, a valve member for said port movably positioned in said chamber, one end of said piston moving means being located adjacent said chamber in the path of movement of said valve member for limiting actuation of the valve member in one direction whereby to cooperate with the chamber in providing caging means for said valve member.

In testimony whereof I affix my signature.

DON D. MYERS.